June 5, 1956  C. C. WHITTLESEY  2,749,541
INSTRUMENT PANEL INDICATOR
Filed Dec. 5, 1951
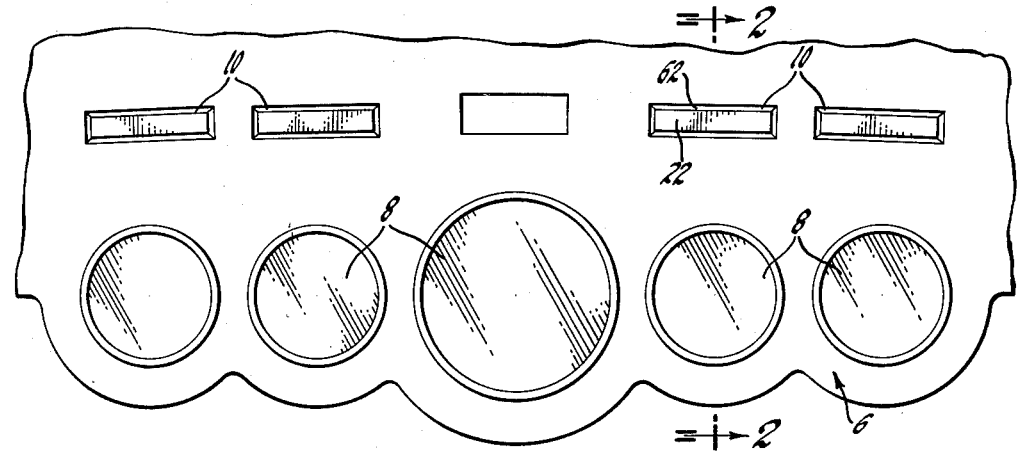
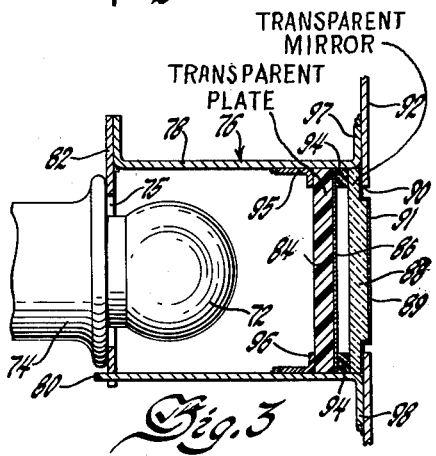
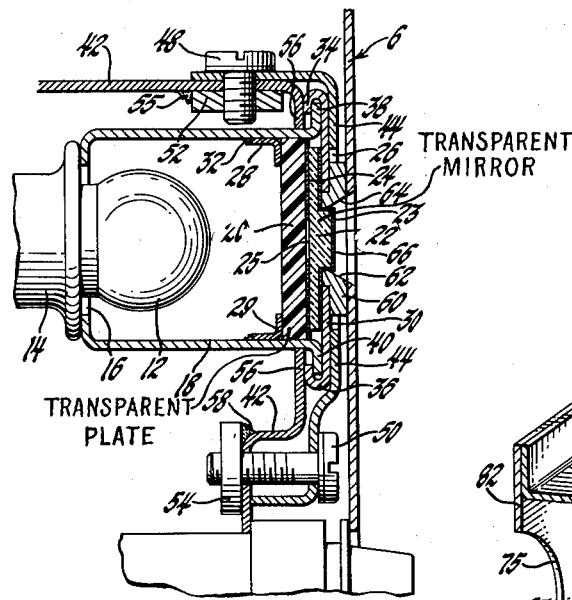
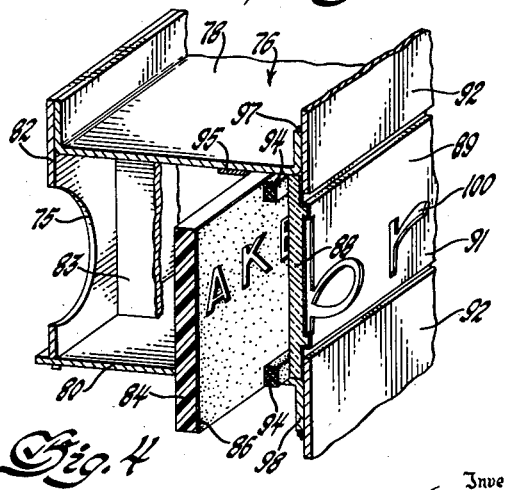
Inventor
Curtis C. Whittlesey
By Willito, Helwig & Baillio
Attorneys

United States Patent Office

2,749,541
Patented June 5, 1956

2,749,541
INSTRUMENT PANEL INDICATOR

Curtis C. Whittlesey, Oak Park, Mich., assignor to General Motors Corporation, Detroit, Mich., a corporation of Delaware Application December 5, 1951, Serial No. 259,990

1 Claim. (Cl. 340—381)

This invention relates to vehicle instrument panel indicators and, more particularly, to instrument panel indicators of the type which give a warning when certain conditions arise in the functioning of the vehicle which make its continued operation harmful.

Instrument panel indicators of the type which give a signal when certain harmful operating conditions arise, are extremely useful on automotive and other vehicles since a prompt warning informs the operator of the condition before serious damage occurs. Such warning indicators, which are often referred to as telltale signals, are useful, for example, to show a low oil level in the crankcase, a high engine temperature, high torque converter oil temperatures and other conditions which, if allowed to prevail, will cause malfunctioning of the vehicle. These signal producing indicators can advantageously be utilized to supplement the ordinary instruments and gauges which form a part of the instrument panel since, by a visual signal such as a light flash, they call the operator's attention to a condition which he might not otherwise notice even though that condition were indicated on the conventional meters or gauges.

Aside from serving as a mounting panel for the various gauges and meters which are essential to the operation of a vehicle, the instrument panel must also serve to give a pleasing appearance, especially in the conventional type passenger vehicles. In recent years it has become increasingly popular to design the instrument panel so that its styling blends with the other beautifying features of the vhicle. Since large numbers of visible indicators, etc., made necessary as automotive vehicles are designed with more automatic features, greatly increase the difficulties in styling the instrument panel and also tend to confuse the operator and demand more of his attention, thus presenting a safety hazard, there is a tendency to avoid those instruments which are not essential and in particular those which only serve to supplement other instruments even though they may be quite beneficial. Thus, the extensive use of danger-indicating or telltale signals has not been too common because of their undesirable effect on the appearance of the instrument panel and because of the increased safety obtained by simplification.

It is an object of this invention to provide instrument panel indicators which blend smoothly with the styling of the instrument panel.

Another object of this invention is to provide instrument panel indicators which are visible only when they are operative to give a signal.

These and other objects are attained in accordance with the present invention by the provision of a signal indicator with a transparent mirror lens which is contoured and colored so as to blend or harmonize smoothly with the styling of the instrument panel.

Transparent mirror lenses are made of a transparent material such as glass, plastic or other suitable material, and have a semi-transparent coating of some metallic material such as silver or chromium. Such lenses are commercially produced by various semi-coating processes. The semi-mirror surface lenses obtained by these processes have the unusual "one way" effect and are available on the market for any number of uses. The glass or plastic material has the appearance of an ordinary mirror when viewed from the more brightly illuminated side but is quite transparent when seen from the darker side toward the light. One commonly used type of "one way" or semi-transparent mirror employs a thin coating of chromium instead of ordinary mirror silver. The chrome surface is much more durable under adverse exposure or treatment than the ordinary unprotected silver.

By using such a mirror lens as one exposed side of a light tight container into which are mounted suitable filters and apertures together with a lamp, and mounting the assembly so that the mirror lens is visible through or projects into an opening in the instrument panel in such a way that it blends or harmonizes smoothly with the color and contour of the panel, the desired effect is obtained. As long as the lamp is off, the lens face appears to be a duplicate match or else an ornamentation for the surrounding metallic or otherwise coated instrument panel. When, however, trouble occurs in the vehicle to cause operation of the telltale lamp the back side of the lens is more brightly illuminated than the face and the operator sees the lighted aperture through the mirror surface. In other words, the signal appears to be glowing directly from the panel surface.

For a better understanding of the invention reference may be had to the drawings in which Figure 1 is a front view of an instrument panel of an automobile or other vehicle having one embodiment of the signal indicators of this invention mounted thereon; Figure 2 is a cross-sectional view taken on the line 2—2 of Figure 1; Figure 3 is a cross-sectional view of another embodiment of the invention; and Figure 4 is a perspective view with parts broken away of the embodiment shown in Figure 3.

Referring now to the drawings, Figure 1 represents a vehicle instrument panel 6, having a suitable metallic or metallic-like finish, in which the conventional instruments 8, such as the speedometer, the ammeter, the oil pressure gauge, etc. are mounted. The signal indicators of this invention are shown at 10 and in this instance are located slightly above the standard instruments.

As can best be seen from Figure 2, the signal light bulb 12 mounted in socket 14 is positioned in the opening 16 provided in the rear of the lamp housing 18, the housing being located behind the instrument panel 6. Mounted near the front opening of the housing 18 is a symbol bearing transparent plate 20 made of plastic or glass or some other suitable material and a transparent mirror lens 22 having a semi-mirror coating 23. The rear face of lens 22 abuts the plate 20 and the front or coated face is rearwardly displaced from the plane of the instrument panel 6. The plate 20 has a discontinuous coating 24 which provides the desired symbols or markings 25. For example, it may be made of a red plastic material and coated in such a manner as to allow the word "Brake" or "Oil" to appear in red when the signal lamp bulb is lighted.

The symbol plate-transparent mirror lens assembly is clamped in the front opening 26 of the housing 18 between the flanged metal strips 28 and 29 and the apertured lens retainer plate 30, the flanged metal strips 28 and 29 being welded as at 32 or otherwise suitably secured to the upper and lower inside walls of the housing. The lens retainer plate 30 is secured to the housing by turning its upper and lower edges 34 and 36 over flanges 38 and 40 provided on the housing.

The thus assembled lamp unit is maintained in position behind the instrument panel by means of a mounting assembly which, in the embodiment shown, includes a support 42 and a clamping member 44, the support being secured to another part of the instrument panel, to the fire wall or to any other convenient part of the vehicle. The support and clamping member are removably secured together by means of the bolts 48 and 50 passing therethrough and threadedly engaging nuts 52 and 54 which can be welded to the support as shown at 55 and 58. When mounted, the turned edges 34 and 36 of the lens retainer plate 30 are clamped between the flange 56 of the support 42 and the clamping member 44, thus maintaining the lamp assembly in position. Removal of the lamp assembly for maintenance can of course be accomplished by merely removing the bolts 48 and 50.

Positioned between the transparent mirror lens 22 and the instrument panel 6 is the frame 60 having a rectangular aperture thereon with forwardly and outwardly sloping edges 62. These forwardly and outwardly sloped edges 62, which may be seen in Figure 1, are aligned with the similarly sloped edges 64 of the opening in the instrument panel, thereby giving the unit a pleasing appearance and providing for unobstructed view of the signal by an angularly displaced observer. A raised portion 66 on the transparent mirror lens 22 fits snugly into the frame opening.

Another embodiment of my invention is shown in Figures 3 and 4. In this embodiment a plurality of signaling lamp assemblies are mounted in spaced relationship behind one elongated transparent mirror lens. Figure 3 shows a cross-section of one of the lamp assemblies in which the signal light bulb 72, mounted in the socket 74, is positioned in an opening 75 provided in the rear of the housing 76, the housing being constructed of top and bottom sections 78 and 80, rear section 82, and side sections (not shown) which are secured together by welds or by some other suitable means. The housing is divided into sections by means of partitions 83 which separate the individual signal light bulbs and symbol bearing plates which are mounted therein. The transparent symbol plate 84 having the discontinuous opaque coating 86 which provides suitable markings, and the transparent mirror lens 88 having semi-mirror coating 89, are mounted in the front opening of the housing 76 so that the lens 88 is positioned over the opening 90 provided in the instrument panel 92. It will be noted that the mirror lens is provided with a raised portion 91 which fits into the opening 90 in the instrument panel so as to blend into the instrument panel contour. In this embodiment a resilient gasket 94, made of rubber or some other suitable material, is held between the plate 84 and the lens 88 and the entire symbol plate transparent mirror lens assembly is clamped between the instrument panel 92 and the flanged metal strips 95 and 96 secured to the upper and lower inside walls of the housing. Flanges 97 and 98, integral with the housing, are secured to the instrument panel by means of welds or by any other suitable means.

As can be seen in Figure 4, the front of the transparent mirror lens 88 may be provided with markings 100, such as brand names, by cutting or embossing. The cutting or embossing is of course accomplished prior to the application of the semi-transparent coating 89. Such markings all the more effectively hide or camouflage the signal lamps except, of course, when they are operative to give a signal in which case the appropriate marking or symbol is flashed through the lens, thus attracting the attention of the vehicle operator.

As was mentioned previously, the transparent mirror lens shown in Figures 3 and 4 extends over a section of a section of the instrument panel which is longer than the individual signalling lamp assemblies. Individual symbol plates or a single plate bearing plurality of spaced symbols are backed up by individual signal light bulbs which are separated from each other by housing partitions or some other suitable means so that a flash or other signal from any one light bulb will only send light through the symbol plate or that section of the symbol plate, directly to its front, thus transmitting the appropriate marking or symbol through the lens 88. In this way an artistically designed facing plate having a finish and contour which blends pleasingly with that of the instrument panel, is utilized to function efficiently to transmit signals from lamps which are completely hidden from view.

When the instrument panel surface, into which the lens plate is fixed, has a chrome surface, a semi-chromed mirror with or without a brand name or other insignia marked in its surface closely matches the color or finish of the instrument panel and thereby gives an artistic appearance without clue as to its function as a lens member. In some instances, depending upon the artistic effect desired, the mirror lens can be used to advantage on panels of colors or finishes other than chrome. In such embodiments the lens will appear as a chrome or other metallic color trim.

A feature which can be employed to great advantage is the provision in the electrical circuits of the telltale lamps, of means whereby the proper operation of the units can be tested. This is an especially desirable feature on these units which are electrically connected to give a signal only upon the happening of a malfunction, the occurrence of which is relatively unusual. Thus, for example, it is rather unusual for the torque oil temperature to become dangerously high so as to cause a signal to be given by a telltale light which is connected to indicate this condition, and therefore after an extended period the operator might suspect that the telltale light is out of order. In this instance, by the provision of a testing means such as a switch and relay in the circuit, the operation of the unit may be tested at any time to assure the operator that it is in working order.

Referring again to Figure 1, the instrument panel shown contains four telltale signals 10, each utilizing a transparent mirror lens which fits artistically into the styling of the panel. I use one of these signals to indicate that the emergency brake is set with the ignition switch turned on by a flash of the word "Brake" through the mirror lens. A second signal is used to indicate a low crankcase oil level, and a third signal is used to indicate a low oil level in the torque converter reservoir. We use the fourth signal to indicate a high oil temperature in the torque converter. These are given of course only as examples of uses to which the telltale signals can be put, it being understood that many others are possible. The same signaling effect can be accomplished by the use of the modification shown in Figures 3 and 4, the only difference being in the artistic effect accomplished by the use of one continuous mirror lens rather than individual lenses as in Figure 1. Numerous other embodiments are of course possible and the one most suitable will depend on the design and styling effect desired.

It is understood, therefore, that although invention has been discussed with specific reference to particular embodiments thereof, it is not to be so limited since changes and alterations therein may be made which are within the full intended scope of the invention as defined in the appended claim.

What I claim is:

In an automotive vehicle instrument panel, a plurality of indicating meters, a member adjacent said meters having a metallic finish and having a plurality of telltale signal lamps mounted therein, each of said telltale signal lamps comprising a housing, a signal light in said housing, an opening in the front of said housing, a transparent mirror lens in said opening and symbol-bearing means in said housing between said transparent mirror lens and said signal light, said lens having a raised portion fitting into an aperture in said member and having a metallic finish blending with the finish of said member, said telltale signal lamps thereby being unobvious to the vehicle operator until operative to give a signal.

References Cited in the file of this patent

UNITED STATES PATENTS

| | | |
|---|---|---|
| 1,304,370 | Ray | May 20, 1919 |
| 1,349,191 | Duncomb | Aug. 10, 1920 |
| 1,719,518 | Nissen | July 2, 1929 |
| 1,858,994 | Kirkland | May 17, 1932 |
| 2,092,368 | Douglas | Sept. 7, 1937 |
| 2,159,328 | Horinstein | May 23, 1939 |
| 2,496,488 | Ohman | Feb. 7, 1950 |
| 2,579,618 | Scofield | Dec. 25, 1951 |
| 2,580,014 | Gazda | Dec. 25, 1951 |